United States Patent [19]

Gilmour

[11] Patent Number: 4,802,148
[45] Date of Patent: Jan. 31, 1989

[54] SIDE-LOOKING SONAR APPARATUS

[75] Inventor: George A. Gilmour, Severna Park, Md.

[73] Assignee: Westinghouse Electric Corp., Pittsburgh, Pa.

[21] Appl. No.: 440,150

[22] Filed: Nov. 8, 1982

[51] Int. Cl.[4] .............................................. G01S 9/66
[52] U.S. Cl. .......................................... 367/88; 367/97
[58] Field of Search ..................................... 367/88, 97

[56] References Cited

U.S. PATENT DOCUMENTS 3,585,579  6/1971  Dorr et al.
3,742,436  6/1973  Jones
3,950,723  4/1976  Gilmour
4,199,746  4/1980  Jones et al. ............................ 367/88

Primary Examiner—Thomas H. Tarcza
Assistant Examiner—Dan T. Pihulis
Attorney, Agent, or Firm—D. Schron

[57] ABSTRACT

A side-looking sonar system utilizing an extremely long arc transducer for ultra high resolution work. The transducer is made up of a plurality of segments each connected to signal processing apparatus which electronically varies the focus of the transducer as a function of time as well as a function of transducer altitude above a target area. Additional beams, parallel to a center beam, may be formed to give the system multibeam capability for increased search rates.

17 Claims, 8 Drawing Sheets

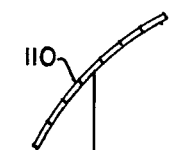
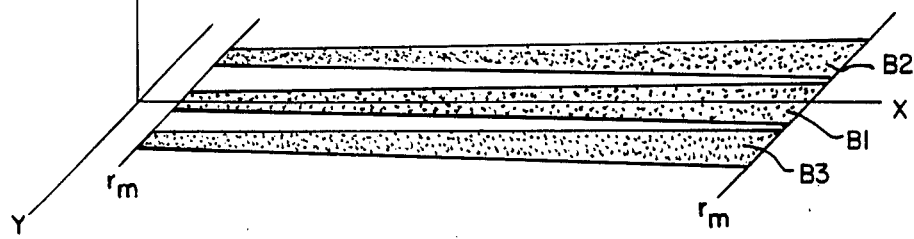
FIG.10.
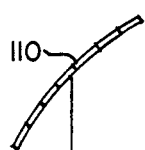
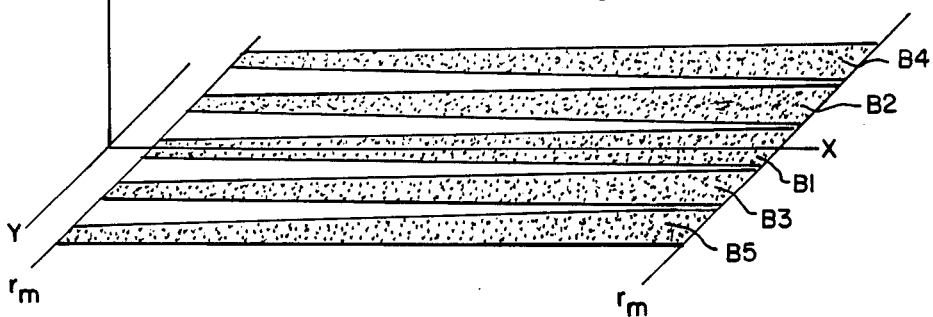
FIG.13.
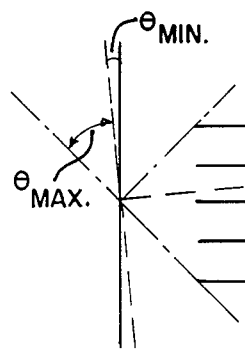
FIG.12.

SIDE-LOOKING SONAR APPARATUS

BACKGROUND OF THE INVENTION

1. Field of the Invention:

The invention in general relates to side-looking sonar systems, and particularly to a system which provides for ultra-high resolution as well as multibeam capability.

2. Description of the Prior Art:

In side-looking sonar systems, a transducer on a carrier vehicle periodically projects pulses of acoustic energy, athwartship of carrier travel toward a target area such as the sea bottom, as the carrier proceeds along a course line. The area upon which the acoustic energy impinges is known as the insonified area and acoustic energy reflected back from the insonified area, as well as targets on it, is received by a receiver transducer. The receiver beam associated with the receiver transducer is extremely narrow in the direction of carrier travel such that the receiver detects reflected acoustic energy from relatively narrow insonified strips (receiver strips) on the sea bottom, during the course of travel.

The received acoustic energy is processed and displayed on a suitable display apparatus. With each pulse transmission and subsequent reception, a scan line is produced on the display to build up a picture of the sea bottom in a manner similar to the scanning of a conventional cathode ray beam in a television picture tube with the presentation being a pattern of highlights and shadows with objects outlined in such a way as to permit their identification.

For increased resolution there has been developed a side-looking sonar transducer which is of a curved configuration wherein the transducer segments forming the receiver transducer lie along an arc of a circle whose radius is the design altitude and wherein acoustic energy is in focus along a line of focus on the sea bottom. These focused transducers must be used at a precise altitude above the sea bottom (plus or minus some limited depth of field) since excursions above or below the design altitude tend to defocus the operation outside of the depth of field and consequently degrade the display to a point where proper target identification is severely limited.

A side-looking sonar system has been developed which provides for relatively high resolution operation without the requirement for operating at a single precise altitude. The system, described in U.S. Pat. No. 3,950,723, hereby incorporated by reference, basically utilizes a multi-segment straight line transducer with signal processng channels connected to each segment of the transducer to continuously and electronically vary the focus as a function of time. The effect of this operation is in essence to simulate a transducer with a sharp curvature to focus close-in early after a transmitted pulse then to decrease the curvature with time as the return comes in from longer ranges. High resolution is achieved with a substantially infinite depth of field which is not necessarily desirable since surface reflections would show up in some instances where objects on the bottom are searched.

The resolution obtainable with such systems is an inverse function of transducer length, and according for ultra-high resolution work the transducer is extremely long, even exceeding 1000 λ where λ is the operating wavelength. With an increased transducer length the number of segments making up the transducer would increase thereby necessitating a significant increase in the number of signal processing channels connected to the transducer segments.

In response to impingement upon a straight line transducer of acoustic energy having a curved wave front, a certain phase differential is experienced by an individual segment from one end to its other. The length of the segment, and accordingly the total number of segments required for a particular length transducer, is determined by a maximum allowable phase differential.

If a curved transducer could be used in place of the straight line transducer, the curvature would more closely match the curved wave front of the acoustic energy received and there would be less of a phase differential from one end of a segment to its other such that greater length segments may be utilized in making up the total length of the transducer and consequently fewer signal processing channels and less electronic circuitry would be required. However, with the extremely long arc transducer for ultra-high resolution operation, the depth of field would be so small as to make the system impractical over a rugged terrain where the distance from the carrier vehicle to the bottom would be subject to frequent variations greater than the depth of field capability of the system.

The present invention obviates the limitations of prior art systems by allowing the use of extremely long arc transducers for obtaining ultra-high resolution displays of a target area and does so without the requirement for flying at a precisely controlled altitude over the target area.

Since the receiver strip upon the target area is extremely narrow in the direction of carrier travel, for ultra-high resolution work, it is desirable that more than one receiver beam be formed in the time it takes for a single acoustic pulse to travel out to the maximum range and return. A multi-beam capability with an arc transducer is described in U.S. Pat. No. 3,742,436, however, the receiver beams, and therefore the receiver strips are not parallel to one another but extend generally radially from a point tending to leave objectionable gaps in the display whereby targets may be missed. The patent does describe the generation of a multiplicity of parallel beams, however, a plurality of arc transducers, each operating at a different frequency, is required thus adding to the cost and complexity of the system. The present invention further allows for the formation of a limited number of additional beams whereby the receiver strips on a target area are generally parallel to one another.

SUMMARY OF THE INVENTION

An ultra high resolution side-looking sonar system is provided which includes a receiver transducer having a plurality of active segments which lie along an arc of a circle in a vertical plane when used above a target area. Means are provided for forming a receiver beam and for electronically focusing the receiver transducer onto the target area at a predetermined initial range and for electronically varying the focusing as a function of time as well as a function of the altitude of the transducer above the target area. When the transducer is flown at an altitude other than its radius of curvature the system results in not only high resolution but an increased depth of field.

Means are additionally provided for rapidly steering one or more beams from a maximum angle to a minimum angle relative to a center beam for detecting acoustic returns from insonified areas parallel to that detected by the center beam.

BRIEF DESCRIPTION OF THE DRAWINGS

FIG. 10 is a view of the multiple beams formed with the circuitry of FIG. 8;

FIGS. 12 and 13 are similar to FIGS. 9 and 10, illustrating the additional beams formed with the circuitry of FIG. 11.

DESCRIPTION OF THE PREFERRED EMBODIMENT

Figure 1:
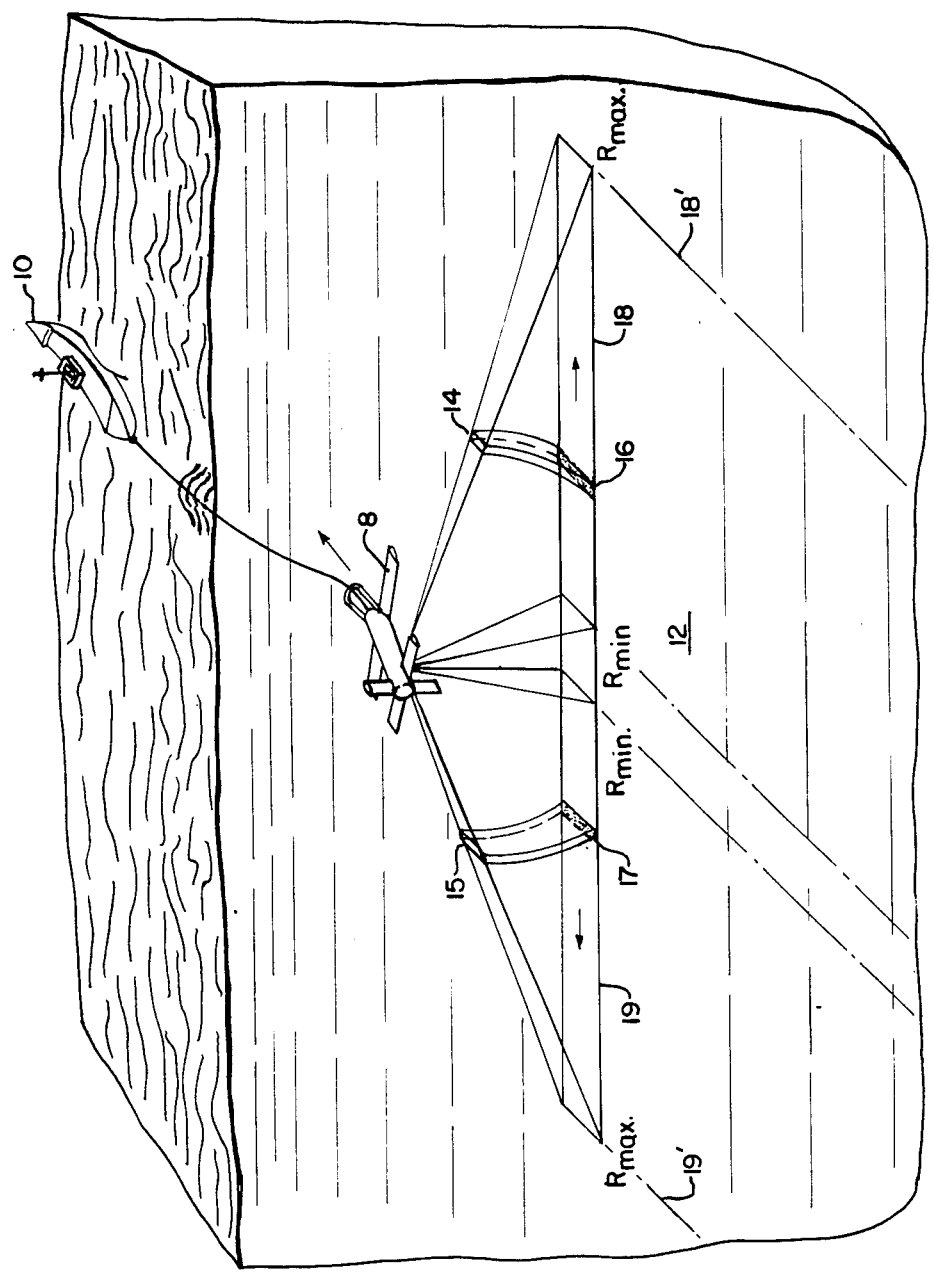
FIG. 1 illustrates a side-looking sonar system in operation over a target area.

Referring now to FIG. 1 which basically illustrates the principles of a side-looking sonar system, an underwater carrier vehicle 8 towed by a surface vessel 10 flies at a certain altitude above a target area such as the sea bottom 12. Side-looking sonar apparatus on the carrier vehicle is operative to repetitively transmit acoustic pulses athwartship of the carrier with two such pulses, a starboard pulse 14 and a port pulse 15 being illustrated. The pulses impinge upon the sea bottom as at 16 and 17 to sweep out respective insonified areas 18 and 19 from some minimum range $R_{min}$ to some maximum range $R_{max}$.

Acoustic returns from the elemental areas 16 and 17, during their course of travel, are received by the side-looking sonar apparatus which is then operable to form one or more receiver beams for examining the insonified strips. Areas 18 and 19 reprsent the strips presently being insonified whereas the areas 18' and 19' represent the accumulation of previously insonified strips from which information has been received.

Figure 2:
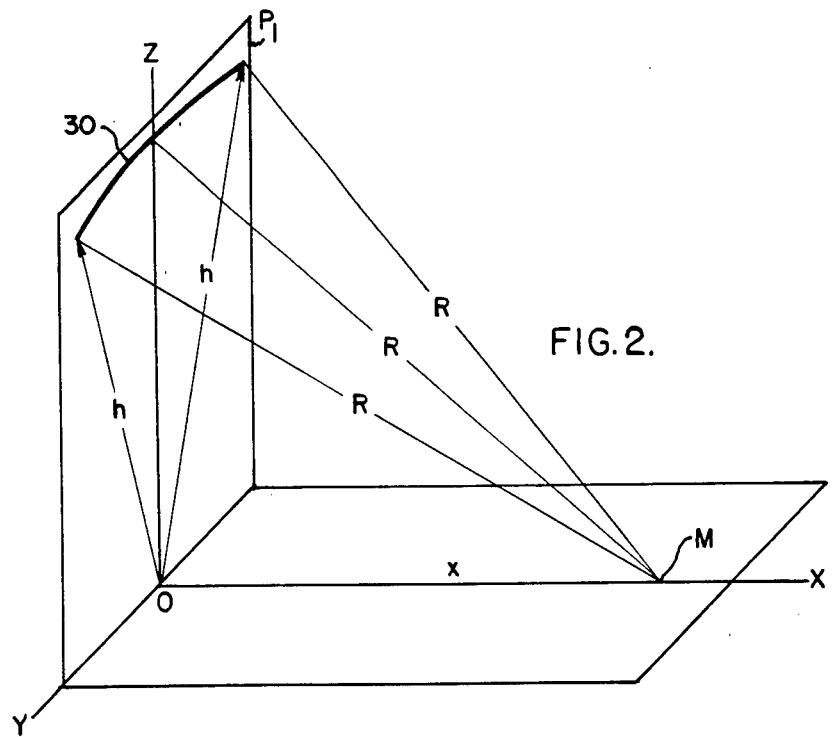
FIG. 2 illustrates, in an X—Y—Z coordinate system, an arc transducer of the prior art.

FIG. 2 illustrates the principles of the focused arc transducer. The X-Y plane represents the sea bottom 12 of FIG. 1 and plane P1 lies in the vertical Y-Z plane. Numeral 30 designates a line in the form of an arc of a circle of radius h having its center at point 0, the intersection of the X, Y and Z axes. The arc transducer itself is made up of a plurality of active transducer segments which generally lie along the arc 30 with each segment being operable to provide a respective output signal in response to the receipt of accoustic energy from the target area. Point M represents a point on the X axis and is at the same distance R from any point on the arc 30. Acoustic energy emanating from any point M on the X axis as a result of a previous insonification, will impinge upon all points of line 30 at the same time and accordingly the transducer is in focus all along the X axis, also known as the line of focus. In actual practice the arc transducer will receive information from a relatively narrow receiver strip which includes the line of focus from a minimum range out to the maximum range, the width of the strip being a function of the operating wavelength, the range, and the length of the arc transducer.

In FIG. 2, h is not only the arc radius but is also the design altitude for the system. The apparatus has a certain depth of field $D_f$ which to a good approximation is $$D_f = \frac{4rh}{L + 2r} \quad (1)$$

where r is the system resolution $=(\lambda(R)/L)$, R is range, h is the arc radius, and L is the transducer length.

The system can tolerate limited altitude excursions of $\pm D_f/2$ without degrading the display. However, excursions outside of the depth-of-field range will cause an objectionable and sometimes intolerable defocusing which prevents proper target identification.

Let it be assumed that the arc 30 of FIG. 2 is at an altitude which is less than h and outside of the allowable depth of field range. The situation is as depicted in FIG. 3.

Figure 3:
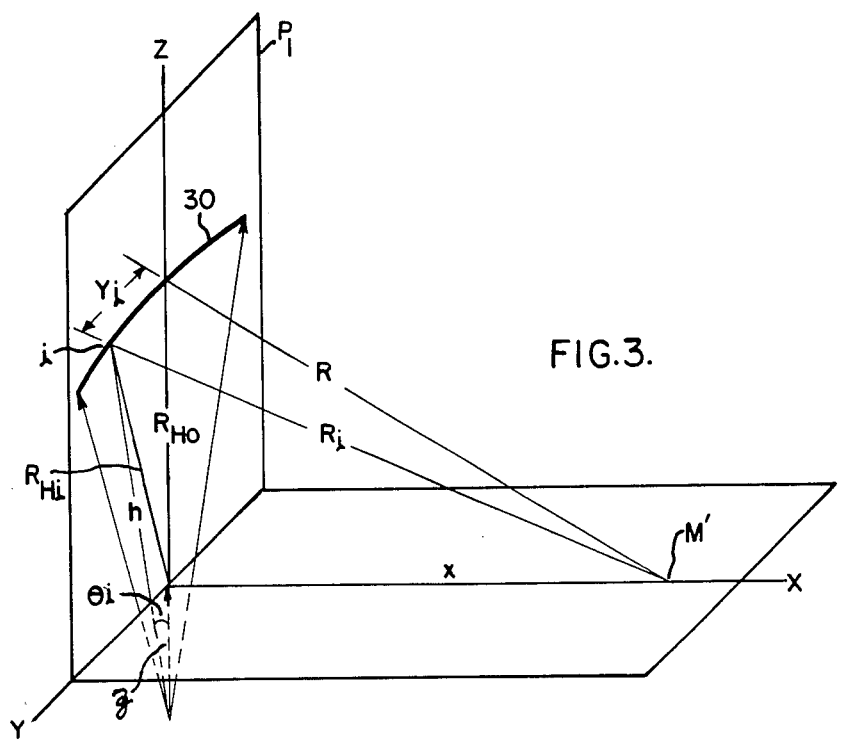
FIG. 3 illustrates the arc transducer of FIG. 2 at an altitude other than its design altitude.

In FIG. 3 arc 30 is at an altitude $R_{Ho}$ above the target area (the X-Y plane) where the new altitude is equal to the old altitude minus some vertical change z; that is, $$R_{Ho} = (h-z) \quad (2)$$

$Y_i$ is the distance from the center of the arc to any point i along the arc, R is the distance from point M' to the center of the arc and $R_i$ is the distance from point M' to point i. $\theta_i$ represents the angle between the vertical and a radius drawn to point i. $R_{Ho}$ to the center of the arc is substantially equal to $R_{Hi}$ to point i.

With the transducer being broken into segments lying along the arc 30, point i represents the center of the $i^{th}$ segment from the center segment of the array constituting the transducer. The difference in range between R to the center segment and $R_i$ to the $i^{th}$ segment will result in differently phased output signals from these segments in response to acoustic energy from point M'. If the output signal from the $i^{th}$ element is phase shifted by a predetermined amount to match the output from the center segment then both segments will effectively be receiving the acoustic energy from point M' simultaneously. Thus by adjusting the phase of the segment output signals the effective curvature of the arc is modified to that required for focusing thereby allowing the arc transducer to be flown at an altitude other than its radius of curvature and to effectively and significantly expand its depth of field.

The present invention utilizes the basic concept taught in the aforementioned U.S. Pat. No. 3,950,723 by varying the phasing of the individual transducer segments so as to provide essentially a phase contour which matches the wavefronts of the incoming reflected acoustic energy from some minimum range out to some maximum range. The apparatus of the present invention differs, however, in that an arc transducer is used and the relative phasing is varied not only as a function of time but also as a function of altitude to keep the targe area in focus when the apparatus is flown at an altitude other than its radius of curvature.

From an inspection of FIG. 3 and using the Pythagorean formula:

$$R_i^2 = R_{Hi}^2 + x^2 \quad (3)$$

$$R^2 = (h-z)^2 + x^2 \quad (4)$$

$$R_{Hi}^2 = (h \cos \theta_i - z)^2 + Y_i^2 \quad (5)$$

subtracting 4 from 3:

$$R_i^2 - R^2 = R_{Hi}^2 - (h-z)^2 \quad (6)$$

eliminating the $R_{Hi}$ term in equation 6 by use of equation 5 results in:

$$R_i^2 - R^2 = (h \cos \theta_i - z)^2 + Y_i^2 - (h-z)^2 \quad (7)$$

Using the approximations that $$\sin \frac{\theta_i}{2} \approx \frac{y_i}{2h} \text{ and } R_i + R \approx 2R$$

it may be shown that $$R_i - R = \frac{z}{h}\left[\frac{Y_i^2}{2R}\right] \quad (8)$$

Equation 8 sets forth the delay equivalent due to the range $R_i$ to the $i^{th}$ segment being greater than range R, in terms of the arc radius h, the deviation z from the normal altitude, the distance $Y_i$ of point i from the center and the distance R. The term in brackets, $Y_i^2/2R$, is the exact term of equation 10 of the aforementioned patent incorporated by reference utilized for focusing the transducer as a function of time. The apparatus of the present invention, however, is modified from that of the patent by taking into account the deviation from the design altitude of an arc transducer such that the bracketed term is modified by the factor z/h. In order to cancel the phase differences between segment output signals of the transducer as a function of not only time, but altitude, the apparatus of the patent may be modified in various ways, one of which is illustrated in FIG. 4 to which reference is now made.

Figure 4:
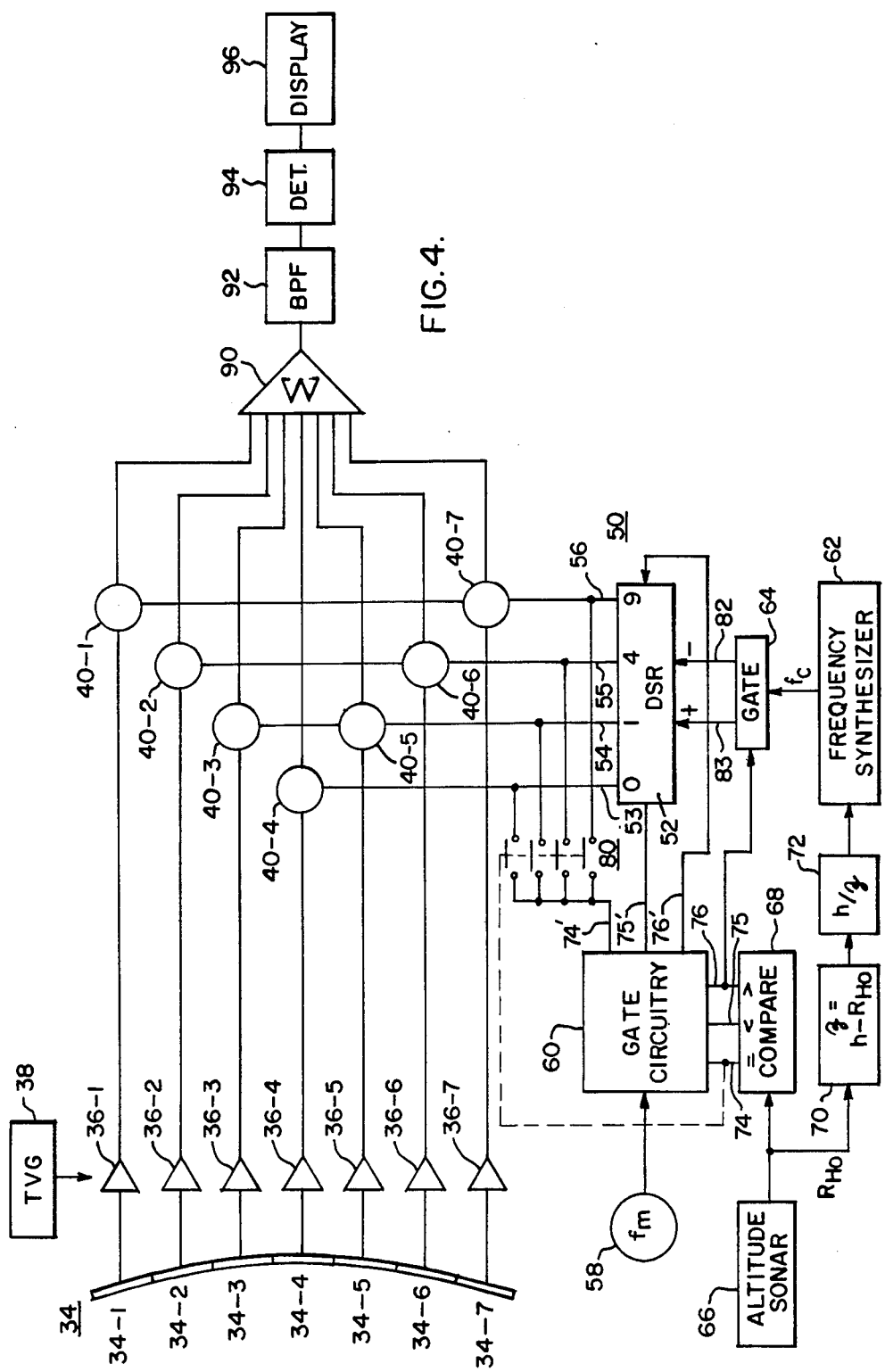
FIG. 4 is a block diagram of one embodiment of the present invention for focusing an arc transducer.

In FIG. 4 a transducer 34 is shown and for purposes of illustration includes seven segments 34-1 to 34-7 having their centers arranged along an arc such as arc 30 of FIG. 3. In actual practice each segment may be made up of individual transducer elements electrically tied together.

A plurality of preamplifiers 36-1 to 36-7 is connected to respective transducer segments with these preamplifiers in turn being provided the time varying gain signal from TVG generator 38, in a well known manner. The segment signals are then respectively provided to signal combining circuits in the form of mixers 40-1 to 40-7.

As was the case in U.S. Pat. No. 3,950,723, the arrangement of FIG. 4 includes a signal generator 50 which provides signals to the mixers in order to cancel any phase difference between the segment output signals so as to maintain the transducer in focus on the target area under investigation. The signal generator 50 includes a digital shift register 52 having a plurality of taps 53 to 56. The mixers are provided with a mixing signal of frequency $f_m$ generated by oscillator 58, via gate circuitry 60 as will be described. When the $f_m$ signal is provided to the digital shift register 52, the latter is clocked by means of an output signal of frequency $f_c$, generated by oscillator 62 preferably in the form of a frequency synthesizer, via a gate circuit 64. The taps provide progressively increasing delays to the mixing signal with the amount of delay being proportional to the square of the tap number. Thus the 0 tap position provides no delay, tap position 1 provides $1^2$ units of delay, tap position 2, $2^2$ units of delay and tap position 3, $3^2$ units of delay.

Means are provided for obtaining an indication of carrier vehicle, and therefore the transducer altitude above the target area, such means in one embodiment taking the form of an altitude sonar 66 operable to generate an altitude signal $R_{Ho}$ to a comparison circuit 68 as well as a circuit 70 for deriving a value of z ($z = h - R_{Ho}$). In accordance with equation 8, the bracketed focusing term must be lowered by a factor of (z/h) which may be implemented by lowering the frequency of $f_m$ to z/h $f_m$. Alternatively, and as illustrated in FIG. 4, $f_c$ may be run faster by a factor of h/z, this modifying factor being derived by circuit 72 in response to the value of z provided by circuit 70.

Figure 5:
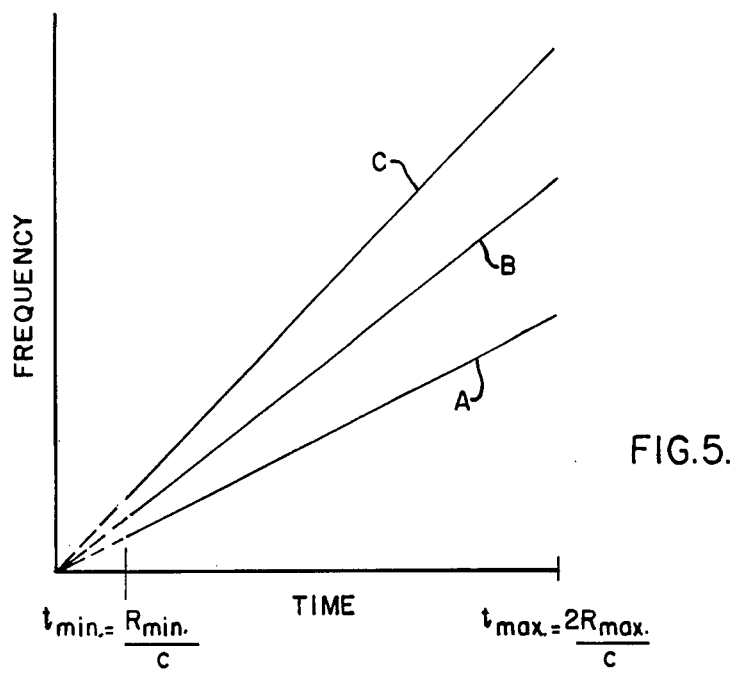
FIG. 5 illustrates different ramping rates of a clocking oscillator of FIG. 4.

By way of example for one value of (h/z), curve A of FIG. 5 illustrates how the frequency $f_c$ increases in value at a certain rate in the time period from $t_{min}$ to $t_{max}$, at which time the waveform would repeat as long as the value of (h/z) remained the same. Curves B and C of FIG. 5 illustrate other slopes due to respective further increases in the value of (h/z) with the upper limit approaching infinity as the altitude approaches the design altitude. In a practical system frequency $f_c$ may range from a low in the kilohertz region to a maximum in the megahertz region.

Referring once again to FIG. 4, in operation, comparison circuit 68 is responsive to the altitude indication from the altitude sonar 66 to generate an output signal on one of three output lines 74, 75 or 76 depending upon whether or not the altitude is equal to, less than or greater than the design altitude, respectively. If the altitude is equal to the design altitude or is within the depth-of-field range for the design altitude then no focus correction is necessary and the $f_m$ signal can be directly supplied simultaneously to all of the mixers, without any delay. In response to an output signal on line 74 indicating an equality, contact switch 80 closes and gate circuit 60 gates the $f_m$ signal directly to the mixers via line 74'.

If the altitude is less than the design altitude, as in FIG. 3, gate circuitry 60 gates the $f_m$ signal via line 75' to the digital shift register 52 where the signal is stepped down the various tap locations as a function not only of time but also of altitude, as determined by the output $f_c$ of frequency synthesizer 62.

If the altitude is greater than the design altitude then the mixing signal must be sent down in the opposite direction through the digital shift register to reverse the sign of the phase shifts. Accordingly, the $f_m$ signal is provided to digital shift register 52 via line 76' and the $f_c$ signal is directed via gate 64 and line 82 to step the shift register in an opposite direction. In the absence of a signal on line 76, gate 64 will direct the $f_c$ clocking pulses to line 83 so that the signal shift would be in the forward direction. Although the signal generator 50 is illustrated as a plurality of different components, it is to be understood that the function thereof may be implemented by a digital computer.

The output signals of the mixers are collectively summed in adder 90 and provided to a band pass filter 92 for eliminating unwanted sidebands and harmonics. The output signal thereof is provided to detector 94 and the informational content of the signal is utilized by a recording or display device 96.

The focusing technique presented in FIG. 4 represents a compromise between the arc transducer with its limited depth of field and a straight line transducer of the referenced patent, with its infinite depth of field. The transducer may be on an arc of, for example, 60 feet to obtain a certain depth of field as defined by equation 1 wherein h would be 60 feet. The actual altitude need not be 60 feet but may be, for example, 20 feet while still maintaining the necessary focusing action for presenting an in-focus display whereby target identification may be made with a high degree of accuracy.

MULTIPLE BEAM FORMING

With the ultra high resolution provided by a long arc transducer an extremely narrow receiver strip is formed on the target area. By way of example an ultra high resolution system may have a typical arc transducer length of $1200\lambda$ where $\lambda$, for an operating frequency of 500 KHz would be 0.01 ft. The beam width would be 0.05° to thus form a receiver strip 3.6" wide at a typical maximum range of $36000\lambda$ (360 ft.) and 0.36" wide at a minimum range of $3600\lambda$ (36 ft.). Accordingy, it is desirable that multiple receiver beams be formed for each acoustic transmission to reduce the time required to scan a target area.

Figure 6:
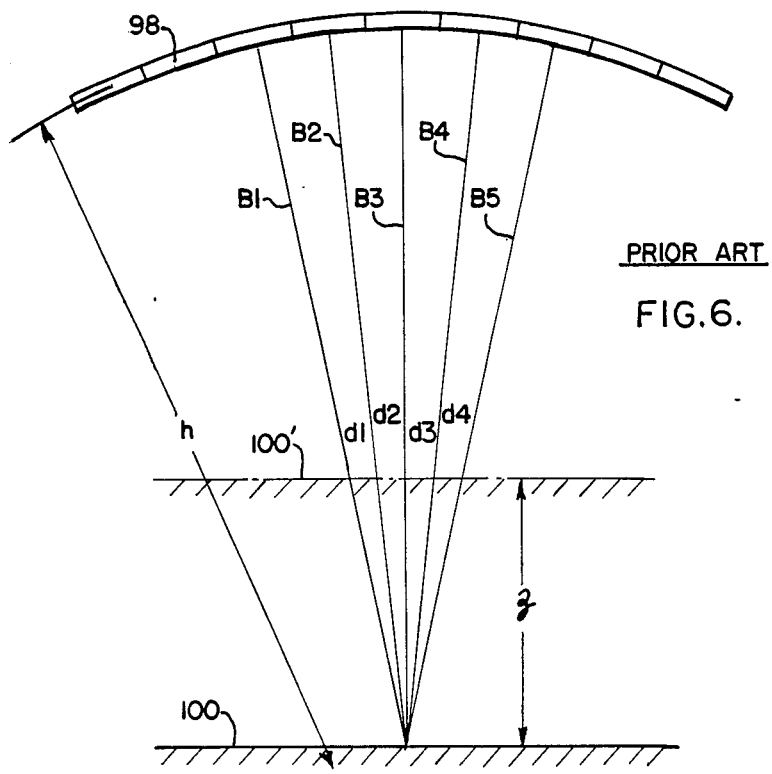
FIG. 6 illustrates a prior art beam formation from an arc transducer.

In the referenced patent, circuitry is provided for forming multiple beams parallel to one another and perpendicular to particular transducer segments. The generation of a plurality of beams, each perpendicular to a particular segment of an arc transducer may not be desirable under various operating conditions. For example, and with reference to FIG. 6, the lines designated B1 to B5 represent the center lines of five beams perpendicular to different segments of an arc transducer 98 having an arc radius h. If the transducer is flown at the altitude h then all of the beams would intersect the bottom 100 at the same place thus proving useless as far as multiple beams are concerned. If the transducer is flown at an altitude less than h, that is at h−z, then the beams on the bottom 100' would be separated by respective distances d1 to d4 which would vary as the altitude varied and placing the beams further apart as the transducer is lowered toward the target area.

Figure 7A:
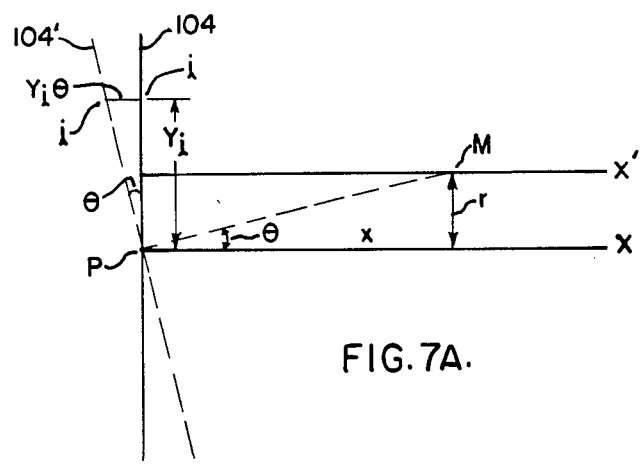
FIGS. 7A and 7B are plan and elevational views of a transducer relative to a point on a target area, for developing certain equations.
Figure 7B:
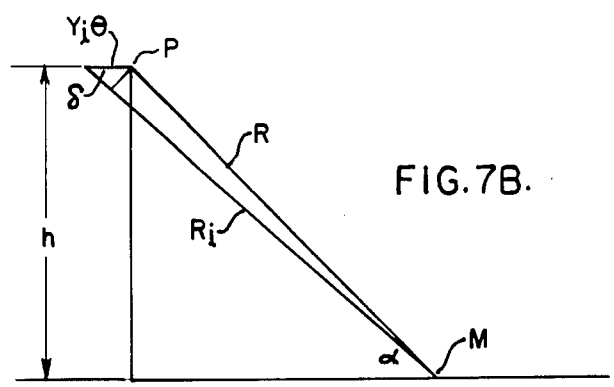

Multiple beam formation is accomplished in the present invention by generating a limited number of receiver beams such that the beams, or receiver strips, are parallel to one another on the target area, regardless of transducer altitude. FIGS. 7A and 7B serve to aid in an understanding of the concept involved.

FIG. 7A is a plan view and FIG. 7B an end view of an arc transducer 104 having its center at point P at an altitude h above the target area. M is any point on line X' displaced a distance r from line X. Dotted line 104' represents the transducer rotated by an angle $\theta$ so that the perpendicular thereto is directed at point M. Distance $Y_i$ is the distance from point P to any point i on the transducer. In FIG. 7B, R is the range from point M to point i while range $R_i$ is the distance from point M to the displaced point, i'. It is to be understood that the figures are not to scale and that the angle $\theta$ has been greatly exaggerated for clarity, with the actual value of $\theta$ ranging from a maximum of ±1° to a minimum of ±0.05°.

The following equations, derived from FIGS. 7A and 7B, are to a good approximation. The object of the following derivation is to find the value of $\delta$, that is, the difference in range $R_i-R$ for any rotated point i on the transducer. The difference can then be electronically generated to steer the transducer beam.

From an inspection of FIG. 7A and for small angles:

$$\theta x = r \tag{9}$$

And from FIG. 7B, $$x = R \cos \alpha \tag{10}$$

Eliminating the term x in equations 9 and 10 and combining yields:

$$(r/H) = \theta \cos \alpha \tag{11}$$

From an inspection of the little triangle at the upper left hand portion of FIG. 7B:

$$\delta = R_i - R = Y_i \theta \cos \alpha \tag{12}$$

Substituting the value for ($\theta \cos \alpha$) from equation 11:

$$R_i - R = (Y_i r/R) \tag{13}$$

It is seen from equation 13 that the steering required for any particular segment i in order to detect energy from points along line X' simultaneously with other segments of the transducer is directly proportional to the distance $Y_i$ and inversely proportional to range, and therefore time. The focusing term is similar to the bracketed term of equation 8 but varies linearly with $Y_i$ rather than quadradically, $Y_i^2$. The necessary steering may be implemented with the use of mixers and a digital shift register which applies a mixing signal to the mixers in response to a clocking signal. The delay provided by the digital shift register will, however, vary linearly from tap to tap as opposed to quadradically. One implementation for circuitry to form multiple beams is illustrated in FIG. 8.

Figure 8:
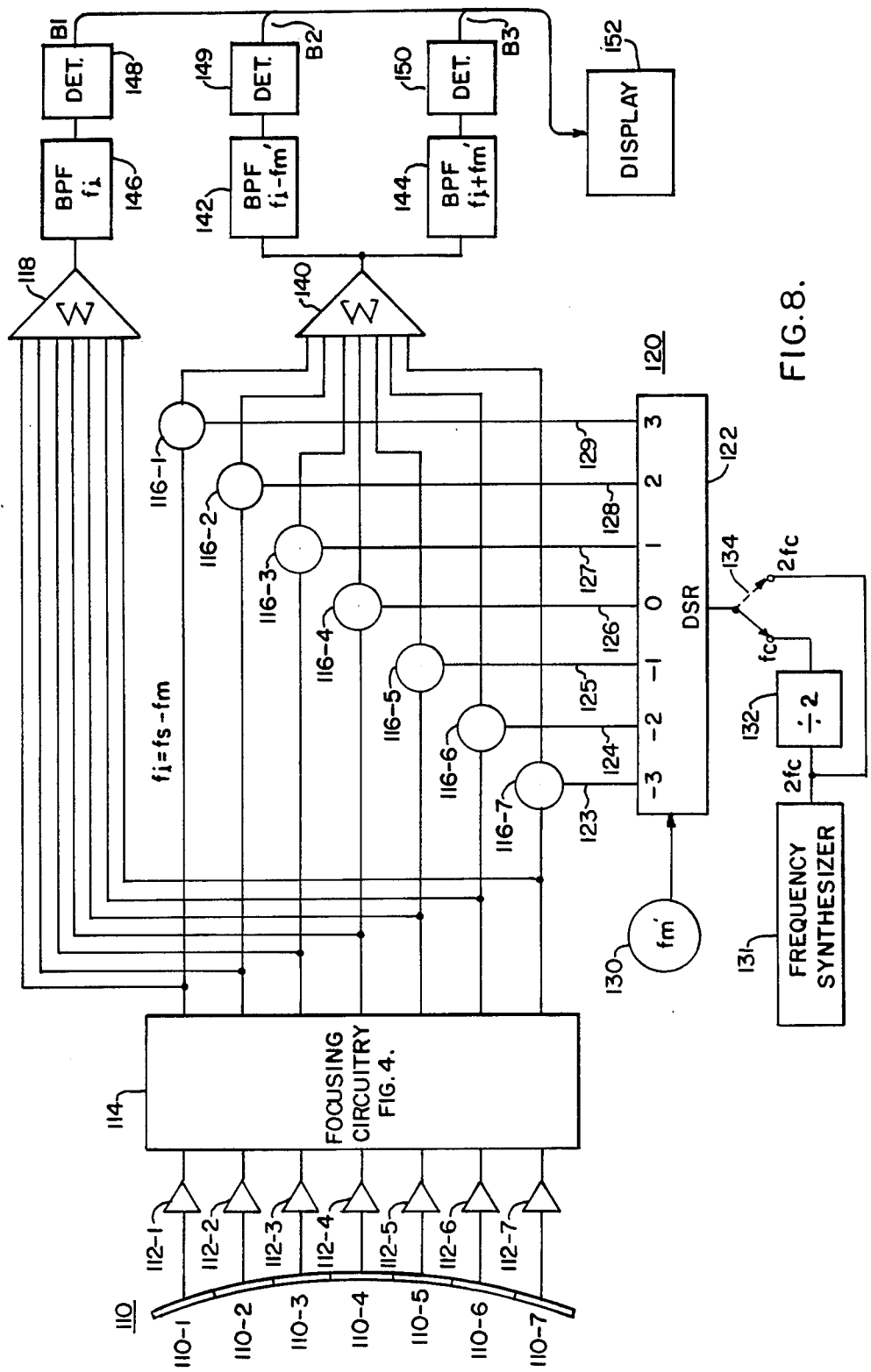
FIG. 8 is a block diagram of circuitry for forming multiple beams.

An arc transducer 110 in FIG. 8 is illustrated as including seven segments 110-1 to 110-7, each segment providing a respective output signal to a plurality of TVG controlled amplifiers 112-1 to 112-7. Block 114 represents focusing circuitry which may be included if desired to perform the focusing action performed by the mixers and signal generator of FIG. 4. The output of each mixer of block 114 includes amongst its signals an intermediate frequency signal of interset $f_i = f_s - f_m$, where $f_s$ is the segment signal. Each $f_i$ signal is provided, in FIG. 8, to a respective mixer 116-1 to 116-7 for phase and frequency shifting. The $f_i$ signals are also provided to an adder 118, similar to adder 90 of FIG. 4, to bypass the mixing operation so as to provide a signal corresponding to a center beam.

A signal generator 120 includes a digital shift register 122 having a plurality of taps 123 to 129 with the center tap 126 being arbitrarily designated as the reference tap and with the remaining taps changing linearly relative to the reference in a positive manner (taps 127, 128 and 129) and in a negative manner (taps 125, 124 and 123). Thus relative to the reference, taps 127 and 125 provide one unit of delay, taps 128 and 124, two units of delay and taps 129 and 123, three units of delay. The signal which experiences the delay and which is provided to the mixer, is generated by oscillator 130, the output mixing signal of which is $f_m'$.

The digital shift register 122 is provided with clock pulses of frequency $f_c$ drived from frequency synthesizer 131 operative to provide a signal of frequency $2f_c$ which if used to clock the digital shift register results in a half range mode where the generated beams are steered only half as much and the maximum range is reduced by a factor of two. For the full range mode the signal of frequency $2f_c$ is divided down in divider 132. Switch 134 is operative to select the full range or half range mode of operation. The operation is somewhat similar to the yaw correction of the referenced patent, however, in the present invention the frequency synthesizer 130 provides an output signal the frequency of which constantly varies with time so as to constantly change the angle of beam steering. If desired, yaw correction can also be applied to the present apparatus.

The outputs of mixers 116-1 to 116-7 include upper and lower sideband signals due to the mixing process. The lower sideband subtracts the phase shifts generated by the digital shift register and steers the beam to one side of the center beam while the upper sideband adds the phase shifts generated by the digital shift register and steers the beam to the other side of the center beam. The mixer output signals are summed in adder 140, the output signal of which is provided to respective band pass filters 142 and 144 to separate the lower and upper side band signals indicative of the two additionally generated beams. Band pass filter 146 connected to receive the output of adder 118 derives the center beam signal and the filtered signals are detected in detectors 148 to 150 and provided to a display 152.

Figure 9:
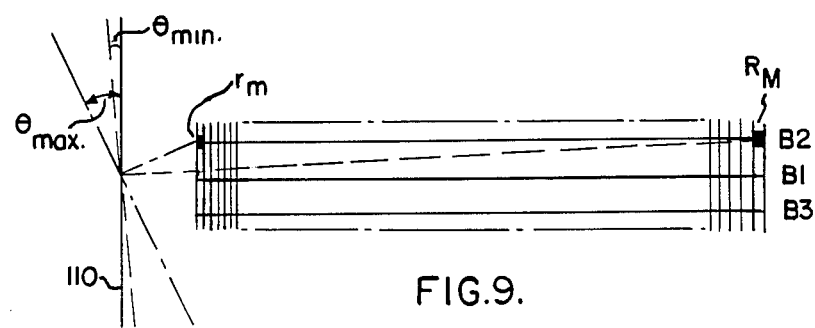
FIG. 9 is a plan view illustrating the operation of the circuitry of FIG. 8.

With additional reference to FIG. 9, numeral 110 represents a plan view of the arc transducer 110 of FIG. 8. The center beam associated with the transducer is represented by line B1. At the time of the expected return from the minimum range of interest, the frequency $f_c$ is of such value to, in effect, steer the transducer shown in dash-dot line, to a maximum angle, $\theta_{max}$, so as to be pointing in a direction to receive the acoustic energy from a first elemental range cell $r_m$ from which the acoustic energy is emanating at that time due to the insonification. As time progresses, the frequency $f_c$ increases such that the angle $\theta$ decreases to a minimum, $\theta_{min}$, at which time the transducer, illustrated in dotted line is pointed to receive acoustic energy from a last elemental range cell $r_M$. Thus, in one period of the frequency $f_c$ the transducer will effectively receive and process information emanating from a first, and subsequent elemental range cells thereby defining a receiver strip which is parallel to B1 and which can be defined as being the result of a receiver beam B2. The steering and formation of B2 is related to the difference frequency provided by band pass filter 142. Although not illustrated, the additive signal provided by band pass filter 144 effectively steers the transducer in an opposite direction from a maximum to a minimum to examine a receiver strip such as would be provided by a beam B3 on the other side of center beam B1.

Since resolution is a function of range, the actual receiver strips would be smaller at minimum range than at maximum range and accordingly each would be trapezoidal in shape as illustrated in FIG. 10 (not drawn to scale).

Figure 11:
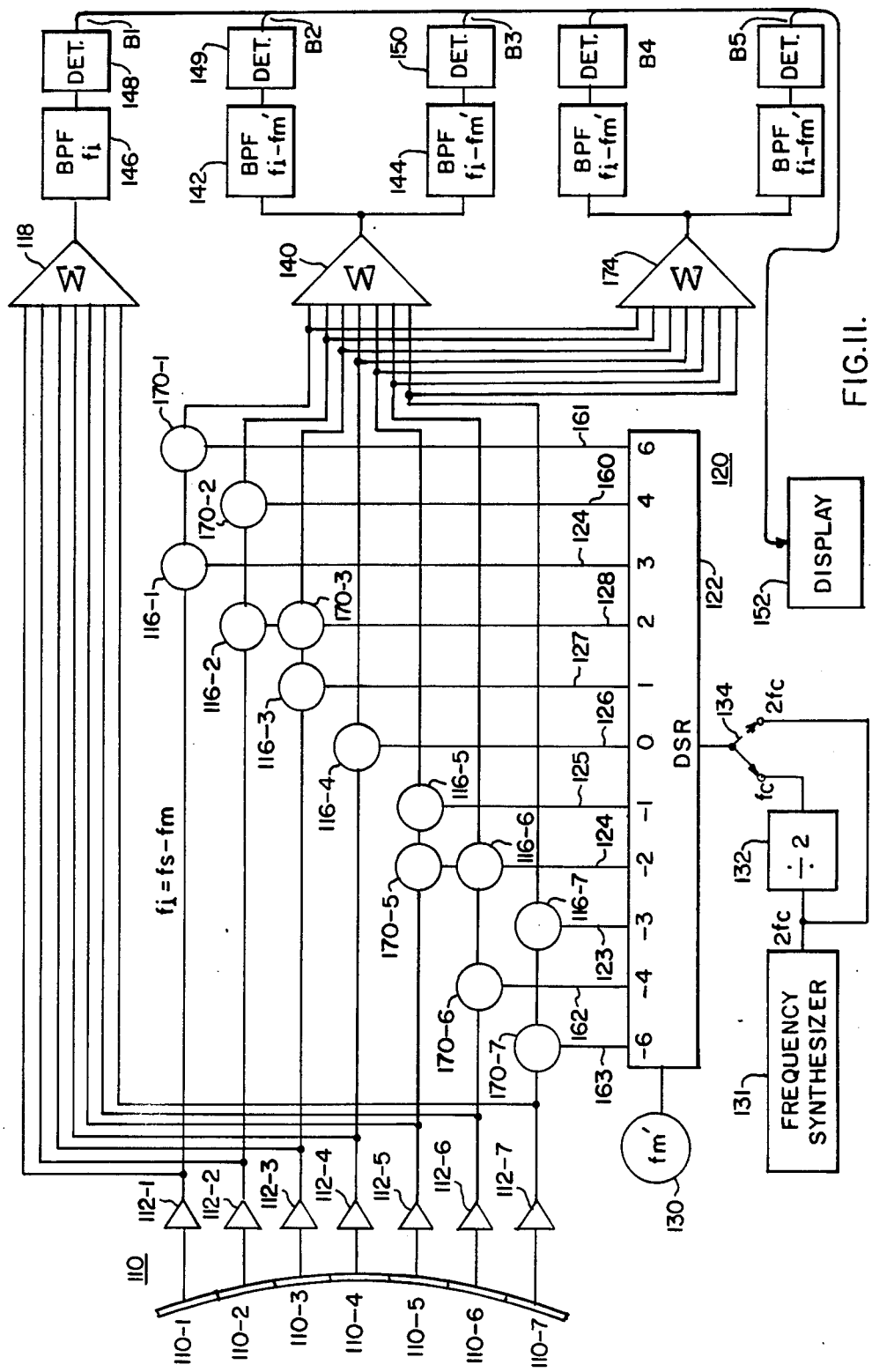
FIG. 11 is a variation of FIG. 8 for forming additional beams.

FIG. 11 illustrates the apparatus of FIG. 8, expanded so as to form two additional beams, B4 and B5, as illustrated in FIGS. 12 and 13 which duplicate FIGS. 9 and 10 with the additional two beams. The two extra beams, B4 and B5, are steered twice as far as the first pair of beams, B2 and B3, and accordingly the circuitry of FIG. 11 includes, on the digital shift register 122, additional tap positions which are twice as far apart as those utilized in FIG. 8. Thus additional taps 160 and 161 provide respective delays of 4 and 6 units while taps 162 and 163 provide respective delays of −4 and −6 units to the mixing frequency $f_m'$.

Taps 123 to 129 are connected as before to respective mixers 116-7 to 116-1. For the generation of the additional pair of beams, mixers 170-1 to 170-3 and 170-5 and 170-7 are supplied, with the mixer 116-4 being connected to the reference tap (0) for both sets of beams. The first set of beams B2 and B3, therefore, utilize tap delays of −3, −2, −1, 0, 1, 2, and 3, whereas the second set of beams B4 and B5, steered twice as far, utilize the tap delays of −6, −4, −2, 0, 2, 4 and 6.

All of the mixer output signals, in addition to being provided to adder 140, are also summed in adder 174, the output of which is provided to two band pass filters 176 and 178 the passed signals of which are detected by respective detectors 180 and 181 for the generation of respective beams B4 and B5 which are displayed together with beams B1 to B3 on the display 152.

It is to be noted that FIG. 11 does not include the focusing circuitry of FIG. 8 since in one embodiment of the invention the beam formation may be applied to an arc transducr which does not utilize the automatic focusing, and may even be applied to straight line transducers. Although the number of beams generated (3 or 5) are limited, the beam generation is accomplished with a minimal amount of circuitry and is ideal for operations where the tow rate is limited, such as in deep ocean work with extremely long tow cables.

What I claim is:

1. Side looking sonar apparatus comprising:
   (A) a receiver transducer having a plurality of active segments arranged along an arc of a circle and each operable to provide output signals in response to receipt of acoustic energy from a target area insonified by repetitive acoustic transmissions;
   (B) circuit means responsive to said output signals and operable to form at least one receiver beam and for electronically focusing said receiver beam onto said target area at a predetermined initial range and for electronically varying said focusing out to a maximum range, as a function of both time, and altitude of said transducer above said target area.

2. Apparatus according to claim 1 which includes:
   A. means for obtaining an indication of said altitude of said transducer.

3. Apparatus according to claim 2 wherein:
   A. said means for obtaining said altitude indication is an altitude sonar.

4. Apparatus according to claim 1 which includes:
   A. additional circuit means operable to form multiple receiver beams essentially parallel to one another.

5. Apparatus according to claim 1 wherein said circuit means includes:
   A. a plurality of mixers each for receiving a respective one of said segment output signals;
   B. signal generator means operable to supply to each said mixer, a signal having a certain amplitude and phase, and to vary said phase relative to the phase of the signals supplied to others of said mixers as a function of both time, and said altitude.

6. Apparatus according to claim 5 wherein:

A. said arc is part of a circle of radius h;
B. said altitude is $R_{Ho}$; and wherein
C. said signal generator is operable to provide all of said mixers with essentially the same signal when $h = R_{Ho}\Delta$, where $\Delta$ is a predetermined altitude increment.

7. Apparatus according to claim 5 wherein said signal generator means includes:
A. a source of mixing signal of frequency $f_m$;
B. means for applying said signal to a first of said mixers and for delaying, by predetermined amounts, the application of said signal to subsequent ones of said mixers;
C. a source of control signal of frequency $f_c$;
D. said control signal being operable to control said means for applying; and
E. means for varying at least one of said frequencies $f_m$ or $f_c$ as a function of said altitude.

8. Apparatus according to claim 7 wherein:
A. said means for applying is a shift register having a plurality of tap locations connected in a predetermined manner to said mixers.

9. Apparatus according to claim 8 wherein:
A. said source of control signal is operable to clock said shift register at said frequency $f_c$.

10. Apparatus according to claim 9 wherein:
A. said frequency $f_c$ is varied as a function of time, and said altitude.

11. Apparatus according to claim 9 wherein:
A. said arc is part of a circle of radius h;
B. said altitude is $R_{Ho}$; and wherein
C. said mixing signal is shifted down said shift register in a first direction when $h > R_{Ho}$; and
D. said mixing signal is shifted down said shift register in an opposite direction when $R_{Ho} > h$.

12. Apparatus according to claim 5 which includes:
A. means to sum the output signals of said mixers;
B. means to filter and detect the summed output signals; and
C. means for utilizing said detected signals.

13. Apparatus according to claim 1 which includes:
A. a carrier vehicle upon which said receiver transducer is mounted for forming said receiver beam for examining said target area to one side of said vehicle;
B. an additional receiver transducer mounte on said carrier vehicle for forming a receiver beam for examining said target area on another side of said vehicle.

14. Side looking sonar apparatus comprising:
A. a receiver transducer having a plurality of active segments arranged along a line and each operable to provide output signals in response to receipt of acoustic energy from a first and subsequent elemental range cells of a target area insonified by repetitive acoustic transmissions;
B. Circuit means responsive to said output signals and operable to form a first receiver beam to examine acoustic returns from said range cells, laterally of said transducer to define a first receiver strip on said target area;
C. said circuit means being additionally operable to form at least a second receiver beam and for steering said beam as a function of time to examine acoustic returns from said range cells on one side of said first receiver strip, to define a second receiver strip essentially parallel to said first receiver strip.

15. Apparatus according to claim 14 wherein:
A. said circuit means is operable to form at least a third receiver beam to examine acoustic returns from said range cells on the other side of said first receiver strip, to define a third receiver strip essentially parallel to said first and second receiver strips.

16. Apparatus according to claim 15 wherein:
A. said circuit means is operable to form fourth and fifth receiver beams so as to define fourth and fifth receiver strips, one on either side of, and parallel to, said first receiver strip and displaced therefrom by said second and third receiver strips.

17. Apparatus according to claim 14 wherein:
A. said segments lie along an arc of a circle.

* * * * *